United States Patent
Waugh et al.

(10) Patent No.: US 12,325,668 B2
(45) Date of Patent: Jun. 10, 2025

(54) EXPANDABLE MALE DIE BLADDER FOR MATCH DIE SHAPE-FORMING SYSTEMS AND METHODS

(71) Applicant: Rohr, Inc., Chula Vista, CA (US)

(72) Inventors: Katherine E. Waugh, San Diego, CA (US); Christopher C. Koroly, Spring Valley, CA (US); Vijay V. Pujar, San Diego, CA (US); John S. Linck, Pueblo, CO (US); Kyle Rosenbrock, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 129 days.

(21) Appl. No.: 17/977,781

(22) Filed: Oct. 31, 2022

(65) Prior Publication Data

US 2024/0140879 A1    May 2, 2024

(51) Int. Cl.
  B29C 70/56 (2006.01)
  C04B 35/83 (2006.01)

(52) U.S. Cl.
  CPC ...... C04B 35/83 (2013.01); *C04B 2235/5248* (2013.01); *C04B 2235/5256* (2013.01); *C04B 2235/604* (2013.01)

(58) Field of Classification Search
  CPC .... B29C 2043/3649; B29C 2043/3647; B29C 2043/3655; B29C 2033/205; B29C 33/505
  See application file for complete search history.

(56) References Cited

U.S. PATENT DOCUMENTS

| | | | |
|---|---|---|---|
| 2,363,107 A | 11/1944 | Serenus | |
| 3,266,767 A | 8/1966 | Long | |
| 3,279,740 A | 10/1966 | Long | |
| 3,901,640 A | 8/1975 | Tigner et al. | |
| 4,338,070 A * | 7/1982 | Nava | B29D 22/00 425/417 |
| 4,443,401 A * | 4/1984 | Turner | B29C 51/06 425/389 |

(Continued)

FOREIGN PATENT DOCUMENTS

| | | |
|---|---|---|
| DE | 742682 | 12/1943 |
| DE | 4234002 | 4/1994 |

(Continued)

OTHER PUBLICATIONS

USPTO; Non-Final Office Action dated Jun. 4, 2024 in U.S. Appl. No. 17/977,913.

(Continued)

*Primary Examiner* — Matthew J Daniels
(74) *Attorney, Agent, or Firm* — SNELL & WILMER L.L.P.

(57) ABSTRACT

A shape forming tool for pre-carbonization compression of a fibrous preform includes a female forming tool comprising a die recess, a support structure moveable with respect to the female forming tool, and at least one bladder coupled to the support structure and configured to be received into the die recess. The support structure is configured to move the bladder(s) with respect to the female forming tool. The bladder(s) is/are configured to be inflated to apply a compressive force to compress and form a fibrous preform between the bladder(s) and the female forming tool.

11 Claims, 9 Drawing Sheets

(56) References Cited

U.S. PATENT DOCUMENTS

| | | | |
|---|---|---|---|
| 5,207,963 A * | 5/1993 | Grace | B29C 51/262 |
| | | | 425/403.1 |
| 5,290,167 A | 3/1994 | Tanaka et al. | |
| 5,321,109 A * | 6/1994 | Bosse | B29C 55/10 |
| | | | 428/910 |
| 5,552,006 A * | 9/1996 | Soliday | G02B 26/0825 |
| | | | 156/291 |
| 6,149,844 A | 11/2000 | Graham | |
| 7,429,172 B2 | 9/2008 | Chotard | |
| 7,622,066 B2 * | 11/2009 | Brustad | B29C 70/543 |
| | | | 264/316 |
| 8,632,330 B2 | 1/2014 | Jones et al. | |
| 9,958,365 B2 * | 5/2018 | Heinlein | G01N 3/08 |
| 10,654,229 B2 * | 5/2020 | Coxon | B29C 70/541 |
| 10,759,122 B2 | 9/2020 | Mathon et al. | |
| 10,889,073 B2 | 1/2021 | Destories et al. | |
| 2004/0043196 A1 | 3/2004 | Willden et al. | |
| 2005/0127566 A1 | 6/2005 | Chotard | |
| 2009/0025448 A1 | 1/2009 | Krogager et al. | |
| 2009/0039566 A1 * | 2/2009 | Rodman | B29C 70/549 |
| | | | 264/529 |
| 2011/0272536 A1 | 11/2011 | Valemnbois | |
| 2012/0196083 A1 | 8/2012 | Hanawa et al. | |
| 2013/0341816 A1 | 12/2013 | Bergmann | |
| 2015/0328843 A1 | 11/2015 | Karb et al. | |
| 2016/0016359 A1 | 1/2016 | Kondo et al. | |
| 2017/0182686 A1 | 6/2017 | Mankowski et al. | |
| 2018/0169972 A1 | 6/2018 | Mathon et al. | |
| 2018/0257314 A1 * | 9/2018 | Destories | B29C 33/505 |
| 2020/0346419 A1 | 11/2020 | Rigamonti et al. | |
| 2020/0384708 A1 | 12/2020 | Salimi et al. | |
| 2021/0221073 A1 | 7/2021 | Knebel et al. | |
| 2022/0080649 A1 | 3/2022 | Plummer et al. | |
| 2024/0060460 A1 | 2/2024 | Minervino et al. | |

FOREIGN PATENT DOCUMENTS

| | | |
|---|---|---|
| DE | 102014015414 | 4/2016 |
| EP | 1778460 | 1/2018 |
| EP | 4104995 | 12/2022 |
| EP | 4261000 | 10/2023 |
| JP | S60206619 | 10/1985 |
| JP | 2001038752 | 2/2001 |
| WO | 0050211 | 8/2000 |

OTHER PUBLICATIONS

European Patent Office, European Search Report dated Mar. 22, 2024 in Application No. 23203824.0.
European Patent Office, European Search Report dated Mar. 27, 2024 in Application No. 23204208.5.
European Patent Office, European Search Report dated Apr. 15, 2024 in Application No. 23206842.9.
USPTO; Non-Final Office Action dated Aug. 30, 2023 in U.S. Appl. No. 17/977,913.
USPTO; Advisory Action dated Feb. 14, 2024 in U.S. Appl. No. 17/977,913.
USPTO; Final Office Action dated Dec. 19, 2023 in U.S. Appl. No. 17/977,913.
USPTO; Final Office Action dated Oct. 7, 2024 in U.S. Appl. No. 17/977,913.
USPTO; Non-Final Office Action dated Feb. 10, 2025 in U.S. Appl. No. 17/977,913.
USPTO; Non-Final Office Action dated Apr. 25, 2025 in U.S. Appl. No. 17/978,053.

* cited by examiner

EXPANDABLE MALE DIE BLADDER FOR MATCH DIE SHAPE-FORMING SYSTEMS AND METHODS

FIELD

The present disclosure relates to systems and methods for shape forming composites, and more specifically, to systems and methods for shape forming fiber-reinforced composites.

BACKGROUND

Composite bodies are utilized in various industries, including the aerospace industry. Needled fiber-reinforced composites are often produced as planar (e.g., flat plate) structures, for example utilizing planar oxidized polyacrylonitrile (PAN) fiber-based preforms followed by carbonization and chemical vapor infiltration (CVI) densification. To make the fiber-reinforcement or a composite material part, it is well known to use a preform that has been needled. This can be achieved by needling two-dimensional plies.

SUMMARY

According to various embodiments, a shape forming tool is disclosed, comprising a female forming tool comprising a die recess, a support structure moveable with respect to the female forming tool, and a first bladder coupled to the support structure and configured to be received into the die recess. The support structure is configured to move the first bladder with respect to the female forming tool. The first bladder is configured to be inflated to apply a compressive force to compress and form a fibrous preform between the first bladder and the female forming tool.

In various embodiments, in response to being inflated, the first bladder is configured to extend laterally from a first side of a recess surface of the female forming tool to a second side of the recess surface, opposite from the first side.

In various embodiments, in response to being inflated, the first bladder is configured to extend vertically from the support structure to a bottom surface of the recess surface of the female forming tool.

In various embodiments, the shape forming tool further comprises a center die extending from the support structure toward the female forming tool.

In various embodiments, the first bladder is mounted to a first side of the center die.

In various embodiments, the shape forming tool further comprises a second bladder mounted to a second side of the center die.

In various embodiments, the center die is configured to compress the fibrous preform against the female forming tool.

In various embodiments, the shape forming tool further comprises a control unit configured to control a position of the center die with respect to the female forming tool, and control a first state of the first bladder and a second state of the second bladder.

In various embodiments, the shape forming tool further comprises gripper plates configured to clamp opposing lateral ends of the fibrous preform to the female forming tool.

In various embodiments, the control unit is further configured to control the gripper plates.

A method for controlling a shape-forming process is disclosed, comprising moving a support structure with respect to a female forming tool, inflating a first bladder, and compressing a fibrous preform between the first bladder and the female forming tool in response to the first bladder being inflated.

In various embodiments, the method further comprises clamping opposing lateral ends of the fibrous preform to the female forming tool.

In various embodiments, the method further comprises varying a clamping force on at least one lateral end of the opposing lateral ends.

In various embodiments, the clamping force is varied based on a measured pressure of the first bladder.

In various embodiments, the method further comprises receiving a bladder pressure of the first bladder at a control unit, and controlling a gripper plate with the control unit based upon the bladder pressure.

In various embodiments, the method further comprises receiving at least one of a fibrous preform tension measurement, a fibrous preform compression measurement, or a support structure position measurement at the control unit.

A method for manufacturing a fiber-reinforced composite part is disclosed, the method comprising positioning a fibrous preform with a female forming tool, the female forming tool comprising a die recess, and forming the fibrous preform into a shaped body. The forming comprises moving a first bladder at least partially into the die recess and over the fibrous preform, wherein the first bladder is mounted to a support structure, activating the first bladder, applying a first compressive force to a bottom wall of the fibrous preform with the first bladder in response to activating the first bladder, and applying a second compressive force to a first sidewall of the fibrous preform with the first bladder in response to activating the first bladder.

In various embodiments, a first caul plate is disposed between the first bladder and the fibrous preform, and at least one of the first compressive force or the second compressive force is applied to the fibrous preform via the first caul plate.

In various embodiments, the forming further comprises moving a second bladder at least partially into the die recess and over the fibrous preform, wherein the second bladder is mounted to the support structure, activating the second bladder, applying a third compressive force to the bottom wall of the fibrous preform with the second bladder in response to activating the second bladder, and applying a fourth compressive force to a second sidewall of the fibrous preform with the second bladder in response to activating the second bladder.

In various embodiments, the forming further comprises moving a center die at least partially into the die recess and applying a fifth compressive force to the bottom wall of the fibrous preform with the center die. In various embodiments, the first bladder is coupled to a first side of the center die and the second bladder is coupled to a second side of the center die.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "fiber volume ratio" means the ratio of the volume of the fibers of the fibrous preform to the total volume of the fibrous preform. For example, a fiber volume ratio of 25% means the volume of the fibers in the fibrous preform is 25% of the total volume of fibrous preform.

As used herein, the term "fiber density" is used with its common technical meaning with units of $g/cm^3$ or g/cc. The fiber density may refer specifically to that of the individual fibers in the fibrous preform. The density will be measured, unless otherwise noted, by taking the weight divided by the geometric volume of each fiber. The density may refer to an average density of a plurality of fibers included in a fibrous preform.

As used herein, "CVI/CVD" may refer to chemical vapor infiltration and/or chemical vapor deposition. Accordingly, CVI/CVD may refer to chemical vapor infiltration or deposition or both.

In general, there are currently two primary methods of manufacturing carbon/carbon ("C/C") materials. The first method involves the layup and cure of a carbon fiber, phenolic resin matrix composite, followed by pyrolysis and subsequent phenolic resin infiltration and pyrolysis cycles. Multiple resin infiltration, cure, and pyrolysis cycles are typically used until the part achieves the desired density. The second method involves fabrication of an oxidized polyacrylonitrile fiber (OPF) or carbon fiber preform, followed by carbonization (for OPF preforms) and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions. A third method may involve a combination of the two aforementioned processes including layup and cure of a carbon fiber, phenolic resin matrix composite, followed by pyrolysis, and CVI densification.

After a fibrous OPF preform (also referred to herein as a fibrous preform) is made, it is carbonized to convert the OPF into carbon fibers. Typically, fibrous preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fibrous preform before carbonizing; however, the OPF have been converted to 100%, or nearly 100%, carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

Fiber-reinforced composite parts of the present disclosure may be formed using OPF fabrics that are shape-formed prior to carbonization. Fiber-reinforced composite parts of the present disclosure may be formed using multi-axial, non-crimp, stitch-bonded, OPF fabrics that are shape-formed prior to carbonization. Fiber-reinforced composite parts of the present disclosure may be particularly useful for high temperature aerospace applications, such as for re-entry vehicle applications or other high temperature applications such as where a hot gas impinges on the vehicle after being rapidly compressed and heated as a result of a high pressure bow shock in front of the vehicle. Fiber-reinforced composite parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure.

Application of OPF-based carbon-carbon composites has been generally limited to simple flat structures including C/C aircraft brake disks. C/C components including leading edges, structural members and other contour-shape carbon composites are often produced as planar structures (i.e., flat, planar components); however, these materials tend to maintain low interlaminar properties. A shape formed 3D C/C part offers opportunity for similar in-plane C/C properties with higher interlaminar properties than planar C/C.

Figure 1A:
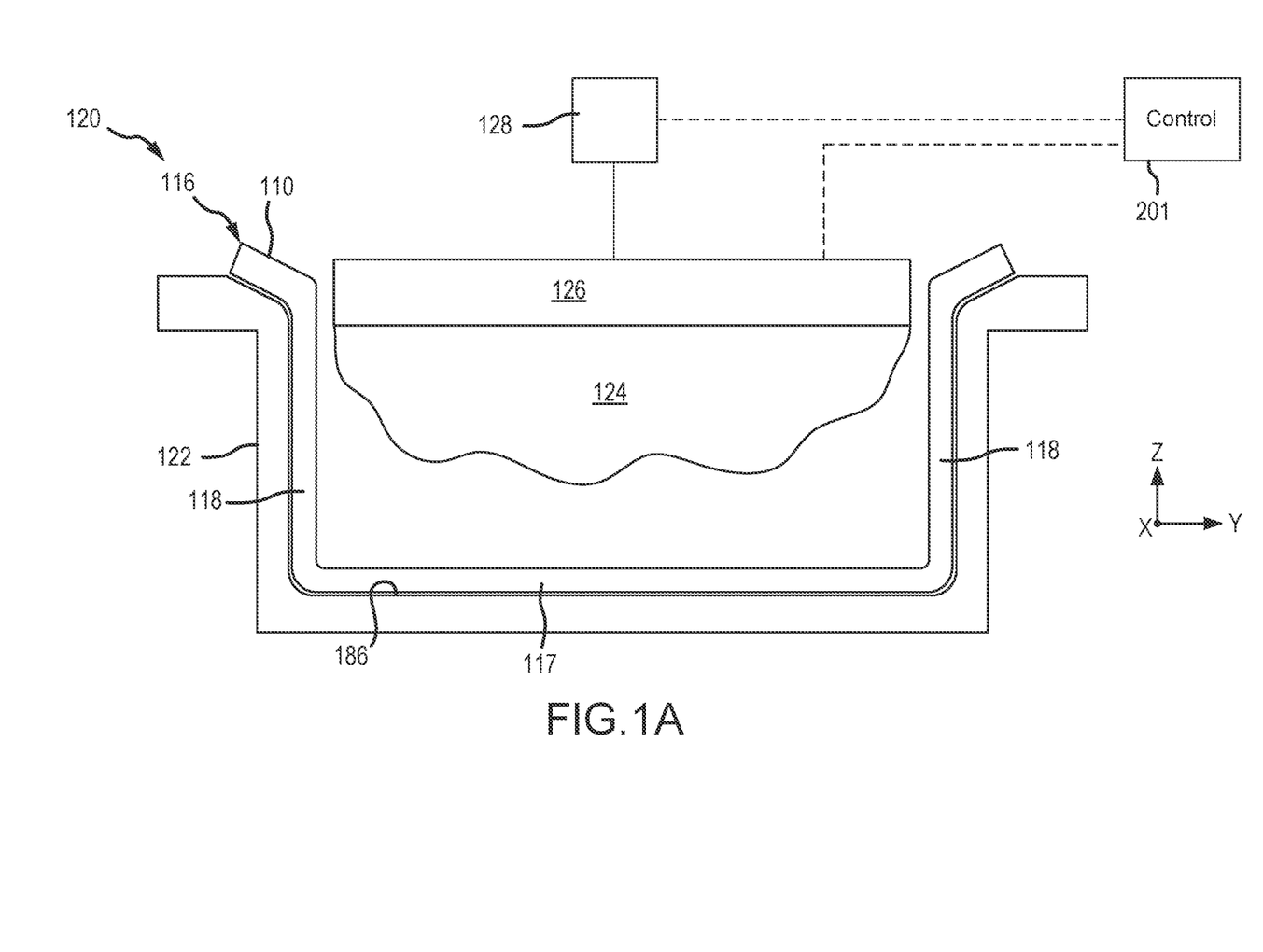
FIG. 1A is a schematic sectional illustration of a shape forming system for pre-carbonization compression and shaping a fibrous preform into a shaped body prior to its bladder being activated, in accordance with various embodiments.
Figure 1B:
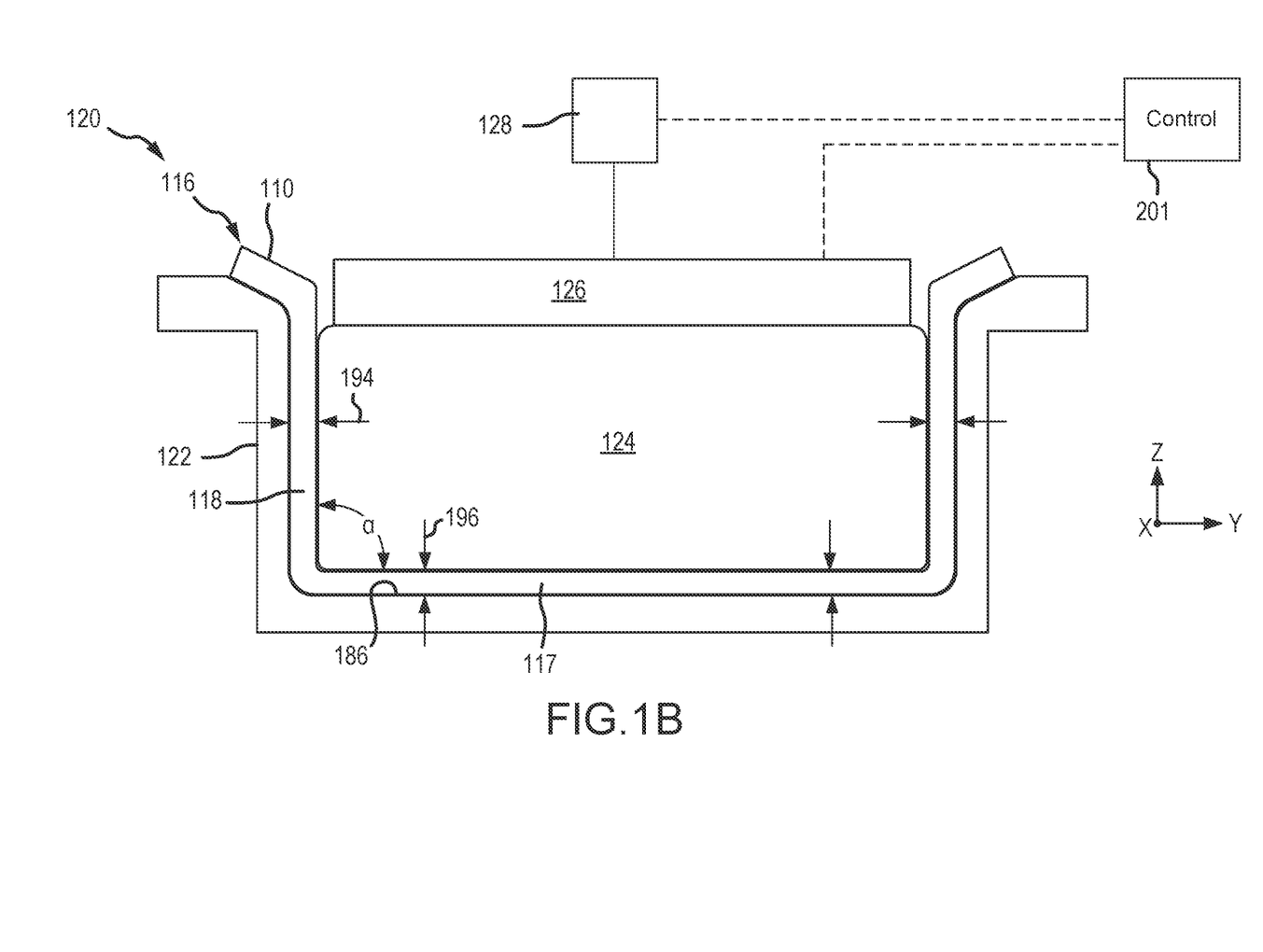
FIG. 1B is a schematic sectional illustration of the system of FIG. 1A with its bladder activated to apply compressive forces to the fibrous preform, in accordance with various embodiments.

FIG. 1A and FIG. 1B are schematic views of a shape forming tool 120 for pre-carbonization compression and shaping a fibrous preform 110, in accordance with various embodiments. Shape forming tool 120 may be configured as a matched die forming tool. Shape forming tool 120 may be configured for forming a shaped fibrous preform 110 from a multi-layered preform; e.g., a stack of a plurality of layers of material. Shape forming tool 120 may include a female forming tool 122 and an expandable male die arrangement comprising a bladder 124 and a vertically translating support structure 126. This expandable male die tooling design allows the shape forming tool 120 to have enough flexibility to maintain pressure application on the fibrous preform 110 (including the sidewalls 118) as the thickness of the material decreases during the pre-carbonization compression process. Support structure 126 may comprise a caul plate (e.g., a metal plate among others) or other type of support structure moveable with respect to female forming tool 122. In various embodiments, female forming tool 122 and/or support structure 126 is made from a metal or metal alloy material. In various embodiments, bladder 124 is made from a rubber material or other elastomeric material capable of expanding (i.e., increasing in volume) in response to being inflated with a compressed fluid.

Figure 2:
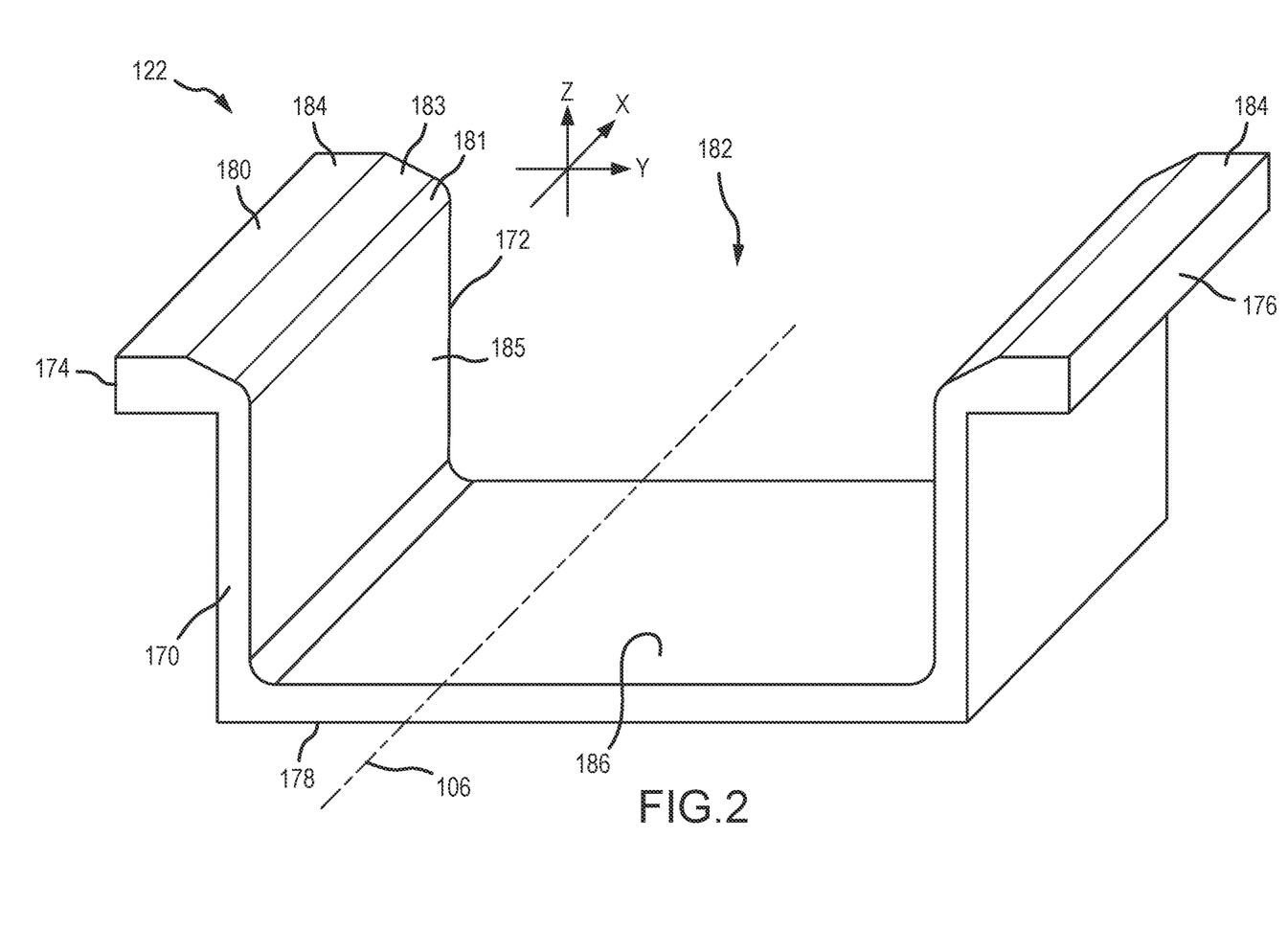
FIG. 2 is a perspective illustration of a female forming tool (a female die), in accordance with various embodiments.

With reference to FIG. 2, the female forming tool 122 extends longitudinally along a longitudinal centerline 106 of the female forming tool 122 (e.g., along X-axis) between and to a first end 170 of the female forming tool 122 and a second end 172 of the female forming tool 122. The female forming tool 122 extends laterally (e.g., along a Y-axis) between and to a first side 174 of the female forming tool 122 and a second side 176 of the female forming tool 122. The female forming tool 122 extends vertically (e.g., along a Z-axis) between and to a bottom side 178 of the female forming tool 122 and a top side 180 of the female forming tool 122.

The female forming tool 122 is configured with at least one die recess 182; e.g., an aperture such as a pocket, a channel, a groove, etc. The die recess 182 of FIG. 2 extends (e.g., partially) vertically into the female forming tool 122 from one or more top surfaces 184 of the female forming tool 122 to a recess surface 186 of the female forming tool 122, where the top surfaces 184 of FIG. 2 are arranged on opposing sides of the recess surface 186 at the female forming tool top side 180. The die recess 182 of FIG. 2 extends longitudinally in (e.g., through) the female forming tool 122, for example, between and to the female forming tool first end 170 and/or the female forming tool second end 172. The die recess 182 of FIG. 2 extends laterally in (e.g., within) the female forming tool 122, for example, between opposing lateral sides of the recess surface 186.

The recess surface 186 is a concave or concave-convex surface and may have a curved geometry; e.g., a compound curvature. The recess surface 186 of FIG. 2, for example, has a curved (e.g., arcuate, splined, etc.) cross-sectional geometry in a lateral-vertical reference plane; e.g., a Y-Z plane. The recess surface 186 may also have a curved (e.g., arcuate, splined, etc.) cross-sectional geometry in a longitudinal-vertical reference plane; e.g., a X-Z plane. This recess curvature may change as the recess surface 186 of the die recess 182 extends laterally and/or longitudinally, which may provide the recess surface 186 with a complex 3D curvature. In various embodiments, the recess curvature may remain uniform as the recess surface 186/the die recess 182 extends laterally and/or longitudinally. The recess surface 186 may be configured without any sharp corners or sharp transitions.

In various embodiments, the recess surface 186 comprises a radii surface 181 which forms a rounded, convex surface transition between a sidewall portion 185 of the recess surface 186 and the female forming tool top surface 184. The fibrous preform may be bent around or over radii surface 181. Radii surface 181 may minimize wrinkling of the fibrous preform 110 during the forming process. Radii surface 181 may facilitate attachment of lateral ends of fibrous preform 110 to gripper plates (e.g., see gripper plates 204 of FIG. 3A). Radii surface 181 may extend between and to the female forming tool first end 170 and the female forming tool second end 172. In various embodiments, an angled surface 183 oriented at an angle (e.g., between 5 and 75 degrees) with respect to the female forming tool top surface 184 is disposed between the radii surface 181 and the female forming tool top surface 184. Angled surface 183 may extend between and to the female forming tool first end 170 and the female forming tool second end 172.

With reference to FIG. 1A and FIG. 1B, methods for manufacturing a fiber-reinforced part of the present disclosure include pre-carbonization compression of a fibrous preform 110. Fibrous preform 110 may comprise polyacrylonitrile (PAN) or OPF fibers extending in three directions and leaving a plurality of pores or open spaces and may be prepared for shape-forming, compression, and carbonization; though fibrous preform 110 may comprise various types of fibers, including carbon fibers, glass fibers, aromatic polyamide fibers, among others. In various embodiments, fibrous preform 110 is formed by stacking layers of PAN or OPF fibers and superimposing the layers (e.g., by stacking sheets of fabric). The layers may be needled perpendicularly to each other (i.e., along the Z-direction) with barbed, textile needles or barbless, structuring needles. In various embodiments, the layers are needled at an angle of between 0° and 80° (e.g., 0°, 30°, 45°, 60°, 80°, etc.) with respect to the Z-direction to each other. The needling process generates a series of z-fibers through fibrous preform 110 that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack of layers is formed. The needles may also penetrate through only a portion of fibrous preform 110, or may penetrate through the entire fibrous preform 110. In addition, resins are added, in various embodiments, to fibrous preform 110 by either injecting the resin into the preform following construction or coating the fibers or layers prior to forming the fibrous preform 110. The needling process may take into account needling parameters optimized to maintain fiber orientation, minimize in-plane fiber damage, and maintain target interlaminar properties.

After needling the fibrous preform 110 (if needling is used), the non-woven fibrous preform 110 may be both compressed to higher fiber volume ratio and formed to shape in a single-step shape-forming process (i.e., using the shape forming tool of the present disclosure). It should be understood, moreover, that fibrous preforms 110 not subject to needling prior to pre-carbonization compression are also within the scope of the present disclosure.

In various embodiments, prior to being shape-formed, the fibrous preform 110 comprises a generally planar shape and may be placed over the female forming tool 122. After the fibrous preform 110 is placed over the female forming tool 122, the bladder 124 and support structure 126 are placed over the fibrous preform 110 and into the female forming tool 122, thereby beginning the shaping and compressing of the fibrous preform 110 as the fibrous preform is pressed into the female forming tool 122. In various embodiments, the bladder 124 and support structure 126 may be first placed into the female forming tool 122 to push the fibrous preform 110 down to the bottom of the recess surface 186. In various embodiments, the fibrous preform 110 may also be first pushed down to the bottom of the recess surface 186 by hand. In various embodiments, the fibrous preform 110 may also be first pushed down to the bottom of the recess surface 186 using an auxiliary tool.

Figures 3A, 3B:
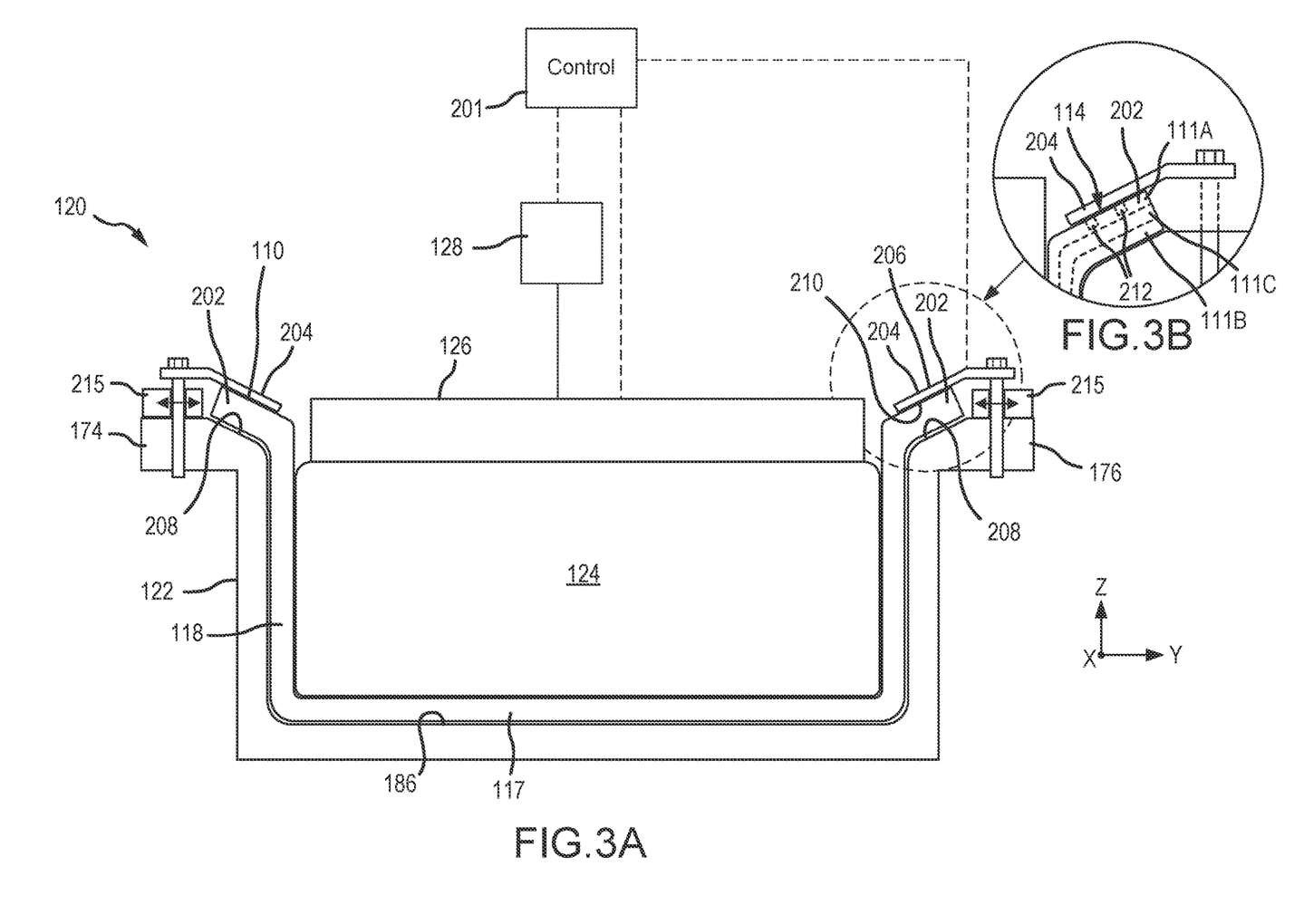
FIG. 3A is a schematic sectional view of the shape forming system with gripper plates in a closed position, in accordance with various embodiments.
FIG. 3B is a schematic sectional view of a gripper plate having protrusions in a closed position, in accordance with various embodiments.

With reference to FIG. 3A, once the fibrous preform 110 is generally pushed down (in the negative Z-direction) in place against the bottom of the recess surface 186 (e.g., by hand or using the bladder 124), the opposing lateral ends 202 of fibrous preform 110 may be clamped to female forming tool 122 using one or more gripper plates 204. The gripper plates 204 may be arranged in one or more arrays disposed along a respective opposing side 174, 176 of the female forming tool 122. In various embodiments, discrete gripper plates 204 are longitudinally spaced from each neighboring (e.g., adjacent) gripper plate 204 in the same gripper plate array. However, in various embodiments, a single gripper plate 204 may extend longitudinally along the side of the female forming tool 122.

Each gripper plate 204 may include a first plate portion 206 oriented substantially parallel with a clamping surface 208 of the female forming tool 122. A grip surface 210 of the gripper plate 204 may be configured to contact the fibrous preform 110. The grip surface 210 may be configured with a relatively high coefficient of static friction and/or kinetic friction, whereas each female forming tool clamping surface 208 may be configured with a relatively low coefficient of static friction and/or kinetic friction. The grip surface 210, for example, may be textured whereas each female forming tool clamping surface 208 may be smooth; e.g., polished. The grip surface 210 may also be formed from a material with a higher coefficient of static friction and/or kinetic friction than the material of the female forming tool 122.

The grip surface 210 of FIG. 3A may be aligned with a respective portion of the female forming tool clamping surface 208. The grip surface 210 of FIG. 3A, for example, at least partially or completely laterally and/or longitudinally overlaps the respective portion of the female forming tool clamping surface 208.

In various embodiments, the gripper plates 204 may be controlled—e.g., by a control unit 201—in concert with the bladder 124. In various embodiments, control unit 201 includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 201 controls, at least various parts of, and operation of various components of, the shape forming tool 120. The control unit 201 may control a position of the support structure 126, thereby controlling a position of the bladder 124. Control unit 201 may control an inflation pressure of bladder 124 (e.g., via compressed fluid source 128). The control unit 201 may control a position of the gripper plates 204 (e.g., a clamping force and/or a tension force applied to the fibrous preform 110).

In various embodiments, control unit 201 may be configured to send a control signal to the support structure 126 (i.e., to a control mechanism thereof, such as a linear actuator or other mechanism for controlling a position of the support structure 126). Control unit 201 may be further configured to send a control signal to gripper plates 204 (i.e., to a control mechanism thereof, such as a linear actuator or other mechanism for controlling a position of the gripper plate 204) to control a clamping pressure and/or a clamping tension applied to the fibrous preform 110 by the gripper plates 204. Control unit 201 may be configured to receive feedback signals (e.g., via a force sensor or the like) from gripper plates 204 (e.g., indicating a clamping force and/or a tension force applied to the fibrous preform 110 by the gripper plates) and may control the pressure of bladder 124, the position of support structure 126, and/or the position of gripper plates 204 in concert based upon these feedback signals. In this manner, tension exerted by gripper plates 204 and the shape forming pressure applied by bladder 124 (and or center die 326 (see FIG. 5)) may be actively adjusted simultaneously, or nearly simultaneously, during the manufacturing process.

In various embodiments, gripper plates 204 comprise one or more actuators 215, schematically shown in FIG. 3A, configured to control lateral movement of the gripper plates 204 to apply tension to fibrous preform 110. In various embodiments, actuators 215 are linear actuators configured to move gripper plates 204 laterally with respect to female forming tool 122. Actuators 215 may cause the fibrous preform 110 to be further tensioned as the bladder applies pressure to the fibrous preform 110 (e.g., as support structure 126 is moved toward fibrous preform 110 and/or as the inflation pressure in bladder 124 is increased). In this regard actuators 215 may be controlled by control unit 201.

In various embodiments, the pressure of bladder 124 is used as a setpoint for when to operate the gripper plates 204. As one non-limiting example, if commanding a bladder pressure of 10 psi, when the bladder pressure reaches 5 psi (halfway to full pressure) then the control unit 201 may command the gripper plate 204 to operate (i.e., to apply a clamping force). In general, control unit 201 may receive a measured pressure of the bladder 124 and vary a clamping pressure or a tension applied to the fibrous preform 110 based upon the measured pressure of the bladder 124. Additionally, feedback from position sensors (e.g., to indicate vertical position of support structure 126) or feedback from pressure sensors (e.g., directly measuring compression on the preform) may also be fed into the control unit 201 to operate the gripper plates 204. In various embodiments, a strain gauge (or similar) may be used to send preform tension feedback to the control unit 201 in order to increase or decrease gripper plate tension.

In various embodiments, and with reference to FIG. 3B, grip surface 210 of one or more gripper plates 204 may also include one or more protrusions 212 for penetrating into the fibrous preform 110. The protrusions 212 may thereby lock a portion of the fibrous preform 110 in place; e.g., constrain movement of the respective engaged preform portion.

Figure 4:
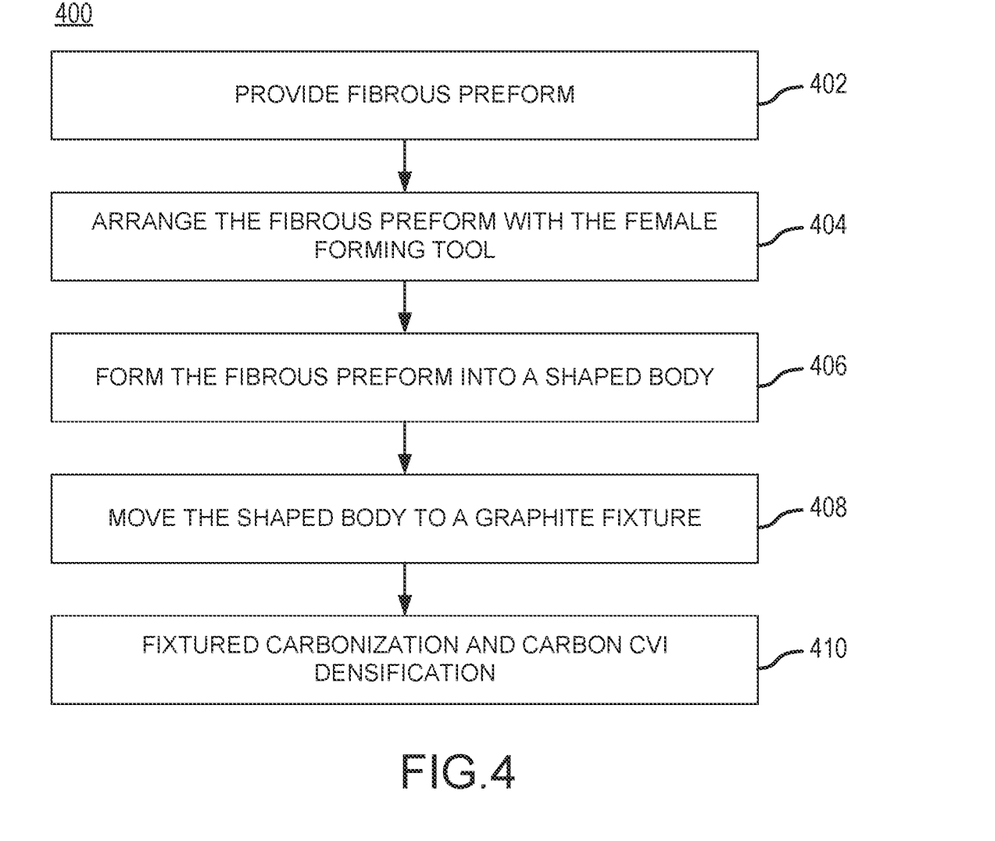
FIG. 4 is a flow chart for a method of manufacturing a fiber-reinforced composite part of the present disclosure, in accordance with various embodiments.

With reference to FIG. 4, a flow diagram of a method 400 for forming a fibrous OPF preform 110 into a shaped body is provided, in accordance with various embodiments. For ease of description, the method 400 is described below with reference to FIG. 1A through FIG. 3B. The method 400 of the present disclosure, however, is not limited to use of the exemplary shape forming tool 120 of FIG. 1A through FIG. 3B.

In step 402, the fibrous preform 110 is provided. Fibrous preform 110 may be configured as a multi-layered preform. The preform 110 of FIG. 3A and FIG. 3B, for example, includes a stack 114 of a plurality of layers of material 111A-C (generally referred to as "111"). This stack 114 includes the top layer of material 111A at/forming a top side of the fibrous preform 110 and the bottom layer of material 111B at/forming a bottom side of the fibrous preform 110. The stack 114 may also include at least one (or more) intermediate layer of material 111C vertically between the top layer of material 111A and the bottom layer of material 111B.

Each layer of material 111 may share a common (e.g., the same) construction and/or material makeup. Each layer of material 111 in the stack 114, for example, may be formed by a sheet/layer of fibrous material; e.g., non-woven oxidized polyacrylonitrile (PAN) fibers. However, one or more layers of dissimilar construction may also be included (e.g., a non-woven with a chopped fiber mat sacrificial material).

In step 404, the fibrous preform 110 is arranged with the female forming tool 122. The fibrous preform 110 is disposed on the female forming tool 122 at its top side 180 (see FIG. 5). The bottom layer of material 111B may engage (e.g., vertically contacts, is abutted against, lays flush on, etc.) the female forming tool top surfaces 184. In various embodiments, heat is added to the fibrous preform 110 during the shape forming process. For example, tool 120 may be heated whereby heat is conducted from the tool 120 into the fibrous preform 110. In various embodiments, it is further contemplated that heaters, separate from the tool 120, may be provided for heating the fibrous preform 110 during the shape-forming process. In various embodiments, components of the shape forming tool 120 may be heated in an oven prior to being introduced to the fibrous preform 110, for example to a shape forming temperature of between 150° F. and 400° F. (65° C.-205° C.) in various embodiments, between 200° F. and 350° F. (93° C.-177° C.) in various embodiments, between 200° F. and 300° F. (93° C.-149° C.) in various embodiments, and between 225° F. and 275° F. (107° C.-135° C.) in various embodiments.

In various embodiments, moisture is added to the fibrous preform 110 during the shape-forming process. For example, a sizing agent comprising a fluid and/or fluid vapor such as water, steam, and/or polyvinyl alcohol may be applied to the fibrous preform 110 (e.g., before being shape formed). Adding the sizing agent to the fibrous preform 110 may dampen the fibers thereof which tends to relax the fibers of the fibrous preform thereby aiding in the bending, forming, and/or stretching of the fibrous preform. Adding the sizing agent to the fibrous preform 110 may tend to reduce wrinkling of the fibrous preform 110. Sizing may help to protect the fiber from handling damage and provide lubricity allowing the fibers to slide easily during preforming/compaction and aid in preventing wrinkling and kinking. Sizing agents of the present disclosure include water soluble polymers. The sizing agent may comprise an aqueous solution. The sizing agent and may comprise long chain alcohols such as polyvinyl alcohols, modified starch, cellulose gum such as carboxymethyl cellulose, modified wax, acrylates, and/or mixtures thereof. In various embodiments, up to about 700 mL (23.7 fluid oz) of water or more may be applied to the fibrous preform 110, though the amount of water is a variable parameter based on a variety of factors, including the size and volume of the fibrous preform 110. In various embodiments, approximately 1 milliliter (ml) of water may be added for every 2.5 cubic inches of fibrous preform (1 ml/2.5 in$^3$), wherein the term approximately as used in this context can only mean±0.5 ml. Stated differently, between 0.5 ml and 1.5 ml of water may be added to the fibrous preform for every 2.5 cubic inches of fibrous preform. However, it should be understood that other amounts of water or sizing agent may be added to the fibrous preform without departing from the scope of the present disclosure. Moreover, the fibrous preform may be preconditioned in a humidity chamber at a humidifying temperature (e.g., between 100° F. (37.8° C.) and 200° F. (93.3° C.)) and a relative humidity (e.g., between 75% and 90% humidity). Adding the sizing agent to the fibrous preform 110 may tend to reduce wrinkling of the fibrous preform 110 and support stabilizing the preform into the desired shape. In this manner, the fibrous preform 110 may be compressed to higher fiber volume ratio and formed to shape using heat, moisture, and pressure into contoured shapes using tool 120 as desired for a particular fiber-reinforced composite part application.

The fibrous preform 110 may be pushed down (in the negative Z-direction) to the bottom of the recess surface 186 of the female forming tool 122 (see FIG. 3A). The bottom layer of material 111B may engage (e.g., vertically contacts, is abutted against, lays flush on, etc.) the female forming tool clamping surfaces 208. The top layer of material 111A may be disposed next to and under the gripper plates 204. The gripper plates 204 of FIG. 3A, for example, are disposed along a periphery of the fibrous preform 110 and its stack 114. More particularly, each of the gripper plates 204 of FIG. 3A (see also FIG. 3B) longitudinally and laterally overlaps the fibrous preform 110 and its stack 114 along opposing sides of the periphery. However, it should be understood that the shape forming process of the present disclosure may be performed without gripper plates 204 (e.g., the periphery of the fibrous preform 110 may extend freely from between the female forming tool 122 and the bladder 124).

The fibrous preform 110 and its stack 114 of the layers of material 111 may have a planar configuration. Prior to forming the shaped body 116, for example, the fibrous preform 110 and its stack 114 of the layers of material 111 may be configured as a flat plate. Of course, in other embodiments, one or more of the layers of material 111 in the stack 114 may slightly bend (e.g., droop) into the die recess 182.

In step 406, the fibrous preform 110 is formed into the shaped body 116. During this formation step 406, support structure 126 and bladder 124 may together move (e.g., downward) vertically from a first position to a (e.g., closed) position (e.g., see FIG. 1B and FIG. 3A). In various embodiments, support structure 126 and bladder 124 are moved downward together as an assembly. The bladder 124 may be inflated using a compressed fluid source 128. The compressed fluid source 128 may comprise a compressed air tank, a hydraulic reservoir, or any other suitable compressed fluid source for filling the bladder 124 with a compressed fluid. As the bladder 124 is filled, the bladder 124 may begin to expand and compress the fibrous preform 110 and its stack 114 that overlaps (e.g., spans laterally and longitudinally across) the die recess 182. More particularly, the bladder 124 vertically presses against the top layer of material 111A (e.g., at the bottom wall 117) and also laterally presses against the top layer of material 111A (at the sidewalls 118).

As the bladder 124 is filled with a compressed fluid, the bladder 124 may expand laterally (e.g., along the Y-axis) to compress (e.g., see compression forces represented by arrows 194 in FIG. 1B) a sidewall 118 of the fibrous preform 110. Moreover, the bladder 124 may expand vertically (e.g., along the Z-axis) to compress (e.g., see compression forces represented by arrows 196 in FIG. 1B) a bottom wall 117 of the fibrous preform 110. Support structure 126 may react compression forces 196. Stated differently, support structure 126 may be secured from being biased away from female forming tool 122 by compression forces 196. In various embodiments, the support structure 126 may be moved (e.g., downward) in the vertical direction (e.g., along the Z-axis) to compress (e.g., see compression forces represented by arrows 196 in FIG. 1B) the bottom wall 117 of the fibrous preform 110. In various embodiments, the support structure 126 may be moved (e.g., downward) in the vertical direction (e.g., along the Z-axis) to compress (e.g., see compression forces represented by arrows 196 in FIG. 1B) the sidewalls 118 of the fibrous preform 110. Expansion timing of bladder 124 may depend on physical translation, cycle time, and/or temperature.

As the bladder 124 expands and/or the support structure 126 is moved downward, the bladder 124 may reshape the stack 114 of the layers of material 111 to conform to (e.g., take the shape of) the recess surface 186. The fibrous preform 110 and its stack 114 of the layers of material 111, more particularly, are press formed (e.g., stamped) into the shaped body 116 between the bladder 124 and the recess surface 186 of female forming tool 122. Stated differently, inflating the bladder 124 and/or moving the support structure 126 downward causes the bladder to expand in the vertical direction and/or the lateral direction to exert lateral forces (see arrows 192) and/or lateral forces (see arrows 194) into the fibrous preform 110.

In various embodiments, with the bladder 124 in the inflated position, the bladder 124 may extend laterally from a first side of the recess surface 186 to a second side of the recess surface 186, opposite from the first side. Moreover, with the bladder 124 in the inflated position, the bladder 124 may extend vertically from the support structure 126 to a bottom surface of the recess surface 186.

In various embodiments, with the bladder 124 in the inflated position, the shape forming tool 120 and shaped body 116 may be heated to the shape forming temperature (e.g., loaded into an oven) for a predetermined duration (e.g., between an hour and 24 hours in various embodiments). Pressure may be maintained and/or increased within bladder 124 (and/or support structure 126 may be moved downward) while the compressed assembly is in the oven so that the bladder 124 is biased toward the female forming tool 122 as the shaped body 116 compresses and/or shrinks over time. Stated differently, the bladder 124 and/or support structure 126 may be electronically controlled—e.g., by control unit 201—to maintain a predetermined pressure (e.g., as a function of time, temperature, and/or pressure) on shaped body 116 during the heating process. In this regard, control unit 201 may be configured to control a position of the support structure 126 with respect to the female forming tool 122 and may be further configured to control a first state (e.g., inflated or deflated) of the first bladder 324a and a second state (e.g., inflated or deflated) of the second bladder 324b Shape forming tool 120 may form the fibrous preform 110 into the shaped body 116 comprising a final, or near final, shape of the desired fiber-reinforced composite part. In various embodiments, the shaped body 116 comprises a U-shape cross-sectional geometry (e.g., in the Y-Z plane). In various embodiments, the shaped body 116 comprises a complex curvature, depending on the geometry of the recess surface 186 of the female forming tool 122. With reference to FIG. 1B, shaped body 116 including a sidewall 118 bent at an angle α with respect to a bottom wall 117 is illustrated, in accordance with various embodiments. In various embodiments, angle α is between one degree and one hundred and seventy-nine degrees (1°-179°), between thirty degrees and one hundred and seventy degrees (30°-170°), between thirty degrees and one hundred and twenty degrees (30°-120°), between forty-five degrees and one hundred and seventy degrees (45°-170°), between sixty degrees and one hundred and seventy degrees (60°-170°), between ninety degrees and one hundred and seventy degrees (90°-170°), between thirty degrees and one hundred and seventy degrees (30°-170°), between eighty degrees and one hundred degrees (80°-100°), or about ninety degrees (90°). The angle α is generally chosen based on the shape of the desired fiber-reinforced composite part.

The shape forming tool 120 and its components 122, 124, 126 are described above using the terms "bottom" and "top" with reference to exemplary orientations in the drawings. The present disclosure, however, is not limited to any particular formation system orientations. For example, in other embodiments, the female forming tool 122 may alternatively be configured as a top die.

In step 408, the shaped body 116 is released from the shape forming tool 120 for further processing. The shaped body 116 may be removed from the die recess 182 and placed into a similarly shaped graphite fixture which is configured to maintain the compressed shape of the shaped body 116 during a subsequent carbonization process. The components of the graphite fixture may be made from a graphite material or other material suitable for withstanding carbonization and/or densification temperatures.

In step 510, and with the shaped body 116 secured in compression within a graphite fixture, the shaped body 116 may be carbonized to maintain shape and decrease fiber volume. In various embodiments, shaped body 116 together with graphite fixture may be placed in a furnace for carbonization. The carbonization process may be employed to convert the fibers of the shaped body 116 into pure carbon fibers, as used herein only "pure carbon fibers" means carbon fibers comprised of at least 99% carbon. The carbonization process is distinguished from the densification process described below in that the densification process involves infiltrating the pores of the shaped body 116 and depositing a carbon matrix within and around the carbon fibers of the shaped body 116, and the carbonization process refers to the process of converting the fibers of the fibrous preform 110 into pure carbon fibers.

The shape-formed fibrous preform 110 may be carbonized by placing the shape-formed fibrous preform 110 in a furnace with an inert atmosphere. In general, the carbonization process involves heating the shape-formed fibrous preform 110 in a furnace to a temperature greater than about 1,600 degrees Celsius (2912 Fahrenheit). Typically, an inert atmosphere of nitrogen, argon or a vacuum is provided in the furnace during the carbonization process. The heat of the furnace causes a chemical conversion of the OPF that converts the fibers to carbon fibers and drives off other chemicals. Although it is sometimes preferred that the fibers in the carbonized fiber preform be 100% carbon fiber, it is generally acceptable for a less than full conversion to take place. The resulting carbonized fiber preform generally has the same fibrous structure as the fibrous preform before carbonizing. During carbonization, the total mass and the total fiber volume in each fibrous preform is typically reduced due to the loss of non-carbon compounds.

Fiber density of the fibrous preform 110 may increase during carbonization (e.g., from about 1.37 g/cc in OPF state to about 1.77-1.85 g/cc after carbonization, depending on the final carbonization temperature). In various embodiments, the OPF fibers shrink during carbonization, as OPF may have a char/carbon yield of around 50%. As used herein "char/carbon yield" means the remaining mass of the OPF after degrading the OPF using the carbonization process.

After carbonization, the carbonized shaped body 116 may be densified using chemical vapor infiltration (CVI), as described in further detail below. After carbonization, shaped body 116 may be densified. In various embodiments, the shaped body 116 is removed from graphite fixture prior to densification. In various embodiments, the shaped body 116 is placed in a perforated graphite fixture during one or more densification runs. The shaped body 116 may be densified with pyrolytic carbon by CVI using optimized process conditions to maintain shape and support efficient carbon densification. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. In various embodiments, the CVI/CVD process may include a temperature gradient. In various embodiments, the CVI/CVD process may include a pressure gradient. In various embodiments, the CVI/CVD process may include a temperature and a pressure gradient.

CVI/CVD densification may be conducted in a vacuum or partial vacuum (e.g., at pressures of 1-15 torr) or in an inert atmosphere at a temperature in the range from about 900° C. to about 1100° C. (1,652° F. to about 2,012° F.), and in various embodiments in the range of up to about 1,000° C. (1,832° F.) (wherein the term about in this context only means+/−100° C.) for a period of time in the range from about 150 hours to about 650 hours, and in various embodiments, in the range from about 300 hours to about 500 hours (wherein the term about in this context only means+/−24 hours).

As a result, carbon from the hydrocarbon gases separates from the gases and is deposited on and within the fibrous preforms. Typically, the densification process is continued until the preform reaches a density in the range from 1.6 to 1.9 grams per cubic centimeter (g/cc), and in various embodiments, a density of approximately 1.80 g/cc. When the densification step is completed, the resulting C/C part has a carbon fiber structure with a carbon matrix infiltrating the fiber structure, thereby deriving the name "carbon/carbon."

After a first CVI/CVD cycle of 300 to 500 hours, an intermediate heat treat is typically performed, in the same furnace. This heat treat (>1600° C.) serves to dimensionally stabilize the shaped body 116, increase its thermal properties, and increase its porosity for subsequent densification. The shaped body 116 may then be machined to open the porosity further, to help allow for final density to be achieved using only one more CVI/CVD cycle. Part densities after first machining may be in the range of 1.4 to 1.7 g/cc, depending on the part thickness, overall size, and placement within the furnace. Typical, average density range is 1.55-1.65 g/cc.

The densification process may be continued until the preform reaches a desired density, for example in the range from 1.7 to 1.9 grams per cubic centimeter (g/cc), and in various embodiments, a density of approximately 1.80 g/cc. The CVI/CVD process may be continued with the shaped body 116 removed from the perforated graphite fixture. In this manner, the outer surfaces of the shaped body 116 may be more directly exposed to the gas flow. Moreover, the shaped body 116 may be machined in between carbon CVI densification processes (e.g., between fixtured carbon CVI densification and non-fixtured carbon CVI densification and/or between successive non-fixtured carbon CVI densification processes). Machining (e.g., grinding, sanding, milling, grit blasting, etc.) the shaped body 116 may be performed to achieve a final desired part shape. Machining the shaped body 116 may be performed to expose voids, or pores, of the shaped body 116 so as to facilitate infiltration with additional carbon material during subsequent carbon CVI densification. When the densification step is completed, and the desired density is achieved, the resulting C/C part has a carbon fiber structure with a carbon matrix infiltrating the fiber structure, thereby deriving the name "carbon/carbon."

Following the CVI/CVD densification process, the C/C (or other fiber-reinforced composite) part may undergo a final heat treatment (FHT) process. This may be done using the same furnace used for densification or a different furnace. If done using the same furnace, the flow of hydrocarbon gases would be stopped following the end of the densification process and the temperature increased. FHT may be conducted in a vacuum or partial vacuum (e.g., at pressures of 1-15 torr) or in an inert atmosphere at a temperature in the range from about 1200° C. to about 2600° C. (2,921° F. to about 4,712° F.), and in various embodiments in the range from about 1400° C. to about 2200° C. (2,552° F. to about 3,992° F.) (wherein the term about in this context only means+/−100° C.) for a period of time in the range from about 4 hours to about 14 hours, and in various embodiments, in the range from about 8 hours to about 12 hours (wherein the term about in this context only means+/−2 hours). In various embodiments, the FHT process imparts high temperature dimensional stability to the final fiber-reinforced composite part. In various embodiments, the FHT process imparts desired thermal properties associated with thermal shock such as high thermal conductivity, high heat capacity, and/or high emissivity.

Figure 5:
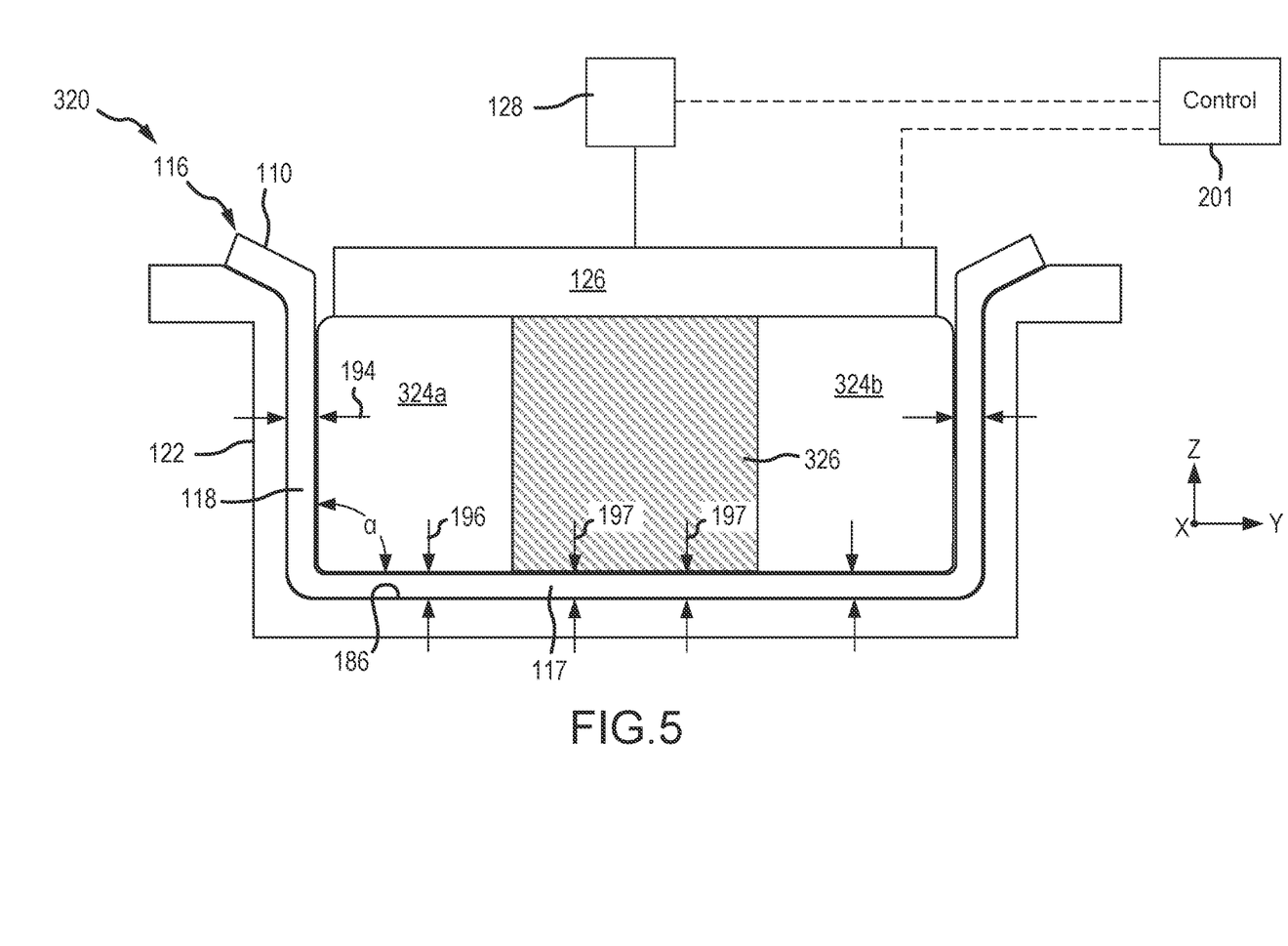
FIG. 5 is a schematic sectional illustration of a shape forming system for pre-carbonization compression and shaping a fibrous preform into a shaped body having a center die and bladders disposed on opposing side of the center die, in accordance with various embodiments.

With respect to FIG. 5, elements with like element numbering, as depicted in FIG. 1A and FIG. 1B, are intended to be the same and will not necessarily be repeated for the sake of clarity.

FIG. 5 is a schematic view of a shape forming tool 320 for pre-carbonization compression and shaping a fibrous preform 110, in accordance with various embodiments. Shape forming tool 320 may be similar to shape forming tool 120, except that shape forming tool 320 further comprises a center die 326 and two bladders (e.g., bladder 324a and bladder 324b) coupled to opposite sides of the center die 326. Center die 326 may be made from a metal or metal alloy. In various embodiments, bladder 324a is mounted to a first laterally facing side of center die 326 and bladder 324b is mounted to an opposing, second laterally facing side of center die 326.

In various embodiments, center die 326 may be supported by support structure 126 and may move together therewith. In various embodiments, center die 326 extends from the support structure 126 toward the female forming tool 122. In response to support structure 126 moving vertically (e.g., downward along the Z-axis), the center die 326 may compress (e.g., see compression forces represented by arrows 197 in FIG. 5) a bottom wall 117 of the fibrous preform 110. Moreover, bladder 324a and bladder 324b may be inflated with a compressed fluid from compressed fluid source 128. In various embodiments, the inflation of bladders 324a and 324b and the vertical movement of support structure 126 may be performed in concert by control unit 201. In various embodiments, center die 326 is moved vertically (e.g., downward) against bottom wall 117 to begin compressing the fibrous preform 110 and to secure the bottom wall 117 of the fibrous preform 110 in place. The bladders 324a and 324b may then be inflated to compress the remainder of the bottom wall 117 and the sidewalls 118 of the fibrous preform 110. Gripper plates 204 (see FIG. 3A) may simultaneously be operated to maintain a desired tension on fibrous preform 110 during the shape-forming process. In this regard, gripper plates 204 may also be operated in concert with the inflation of bladders 324a and 324b and the vertical movement of support structure 126 using control unit 201 and feedback from various components (e.g., bladder pressure, vertical positioning of support structure 126, compressive forces on fibrous preform 110, and/or tension on fibrous preform 110, among other factors as desired).

Figure 6:
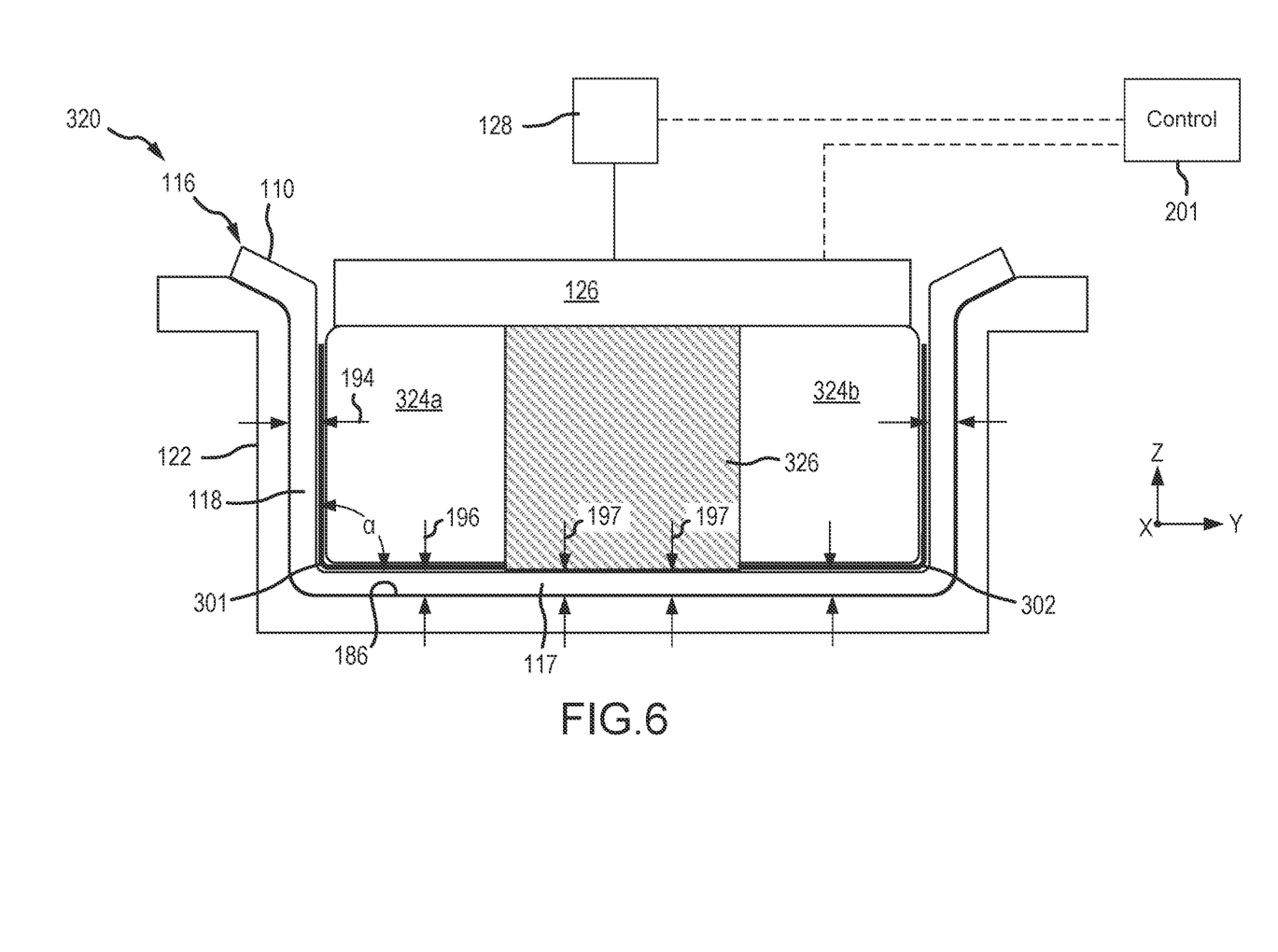
FIG. 6 is a schematic sectional illustration of the shape forming system of FIG. 5 and further comprising a caul plate for each of the bladders, in accordance with various embodiments.

FIG. 6 is a schematic view of shape forming tool 320 further including caul plates (e.g., first caul plate 301 and second caul plate 302) disposed between the first and second bladders 324a, 324b and the female forming tool 122, in accordance with various embodiments. First caul plate 301 may be disposed between first bladder 324a and female forming tool 122. Second caul plate 302 may be disposed between second bladder 324b and female forming tool 122. First and second caul plates 301, 302 may aid in uniformly applying pressure to fibrous preform 110. Moreover, by using caul plates 301, 302, the shape of the inner surface of the fibrous preform 110 may be more precisely controlled. In various embodiments, features may be formed into the inner surface of fibrous preform 110 using caul plates 301, 302. Caul plates 301, 302 may be made from a metal or metal alloy.

In response to actuation, the bladders 324a, 324b will expand to apply uniform pressure to caul plates 301 and 302, respectively, that will form inner surface (i.e., the surface facing away from the female forming tool 122) of the fibrous preform 110. Caul plate 301 may be moveable with respect to caul plate 302. Caul plates 301, 302 may provide a more rigid forming than would be provided with only the bladders 324a, 324b. Caul plates 301, 302 may be more rigid than bladders 324a, 324b.

Figure 7:
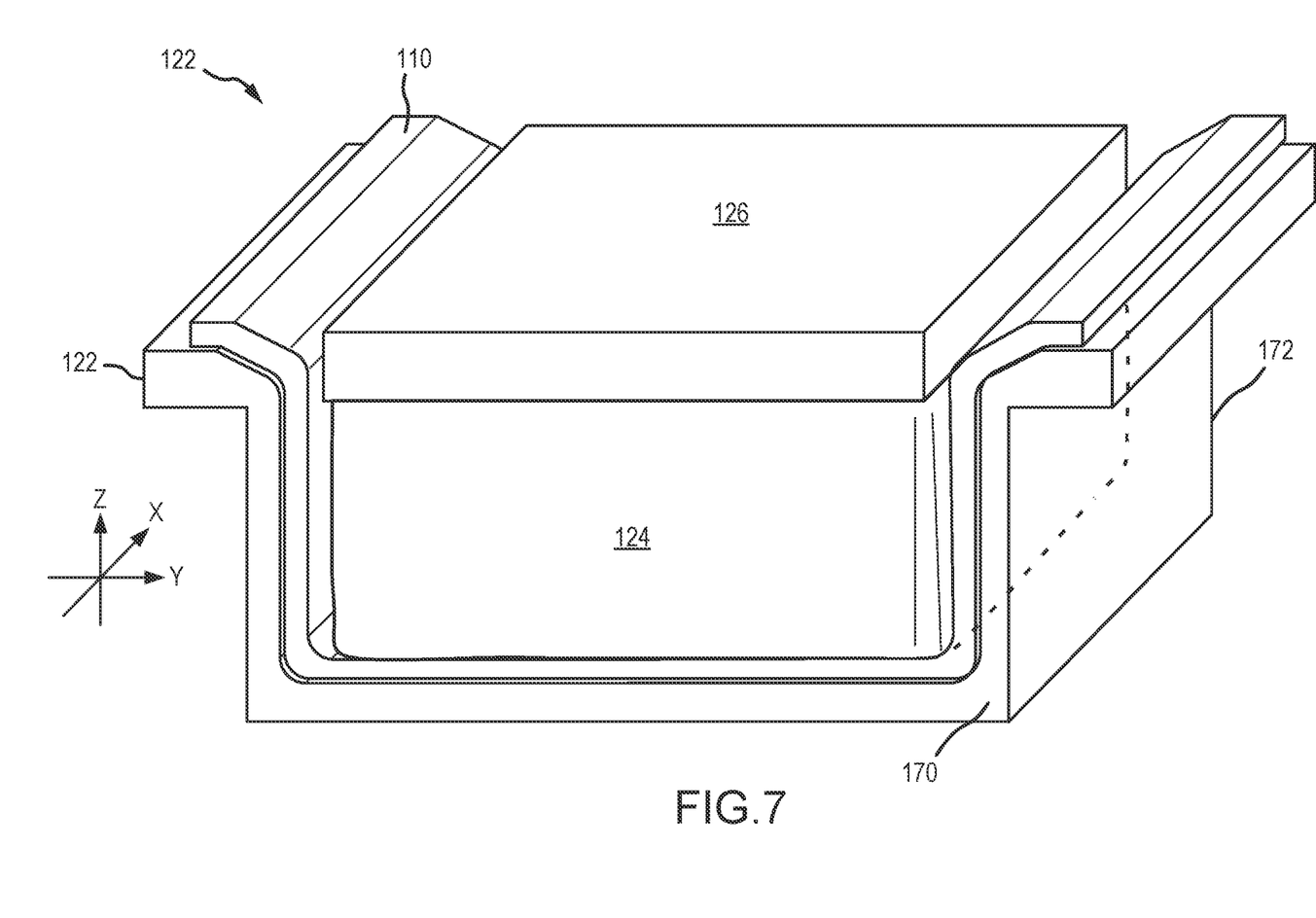
FIG. 7 is a perspective illustration of the shape forming system of FIG. 1A and FIG. 1B with the bladder in an activated state, in accordance with various embodiments.

FIG. 7 is a perspective illustration of the shape forming system of FIG. 1A and FIG. 1B with the bladder 124 in an activated state, in accordance with various embodiments. In various embodiments, bladder 124 extends from and between the first end 170 of the female forming tool 122 and the second end 172 of the female forming tool 122. However, in various embodiments, two or more discrete bladders 124 may be disposed along the longitudinal direction (e.g., along the X-direction).

Figure 8:
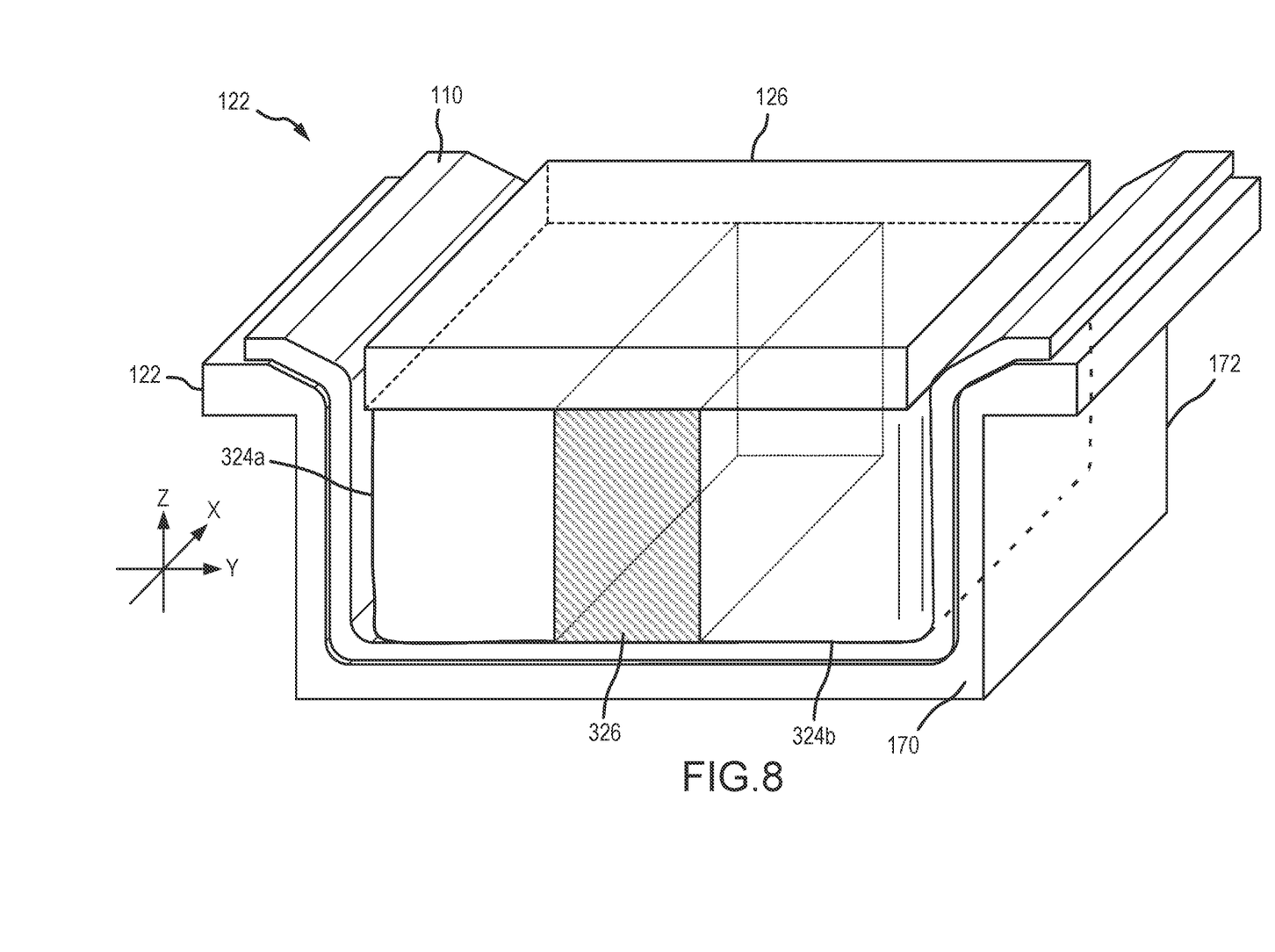
FIG. 8 is a perspective illustration of the shape forming system of FIG. 6 with the first and second bladders in an activated state, in accordance with various embodiments.

FIG. 8 is a perspective illustration of the shape forming system of FIG. 6 with the first and second bladders 324a, 324b in activated states, in accordance with various embodiments. In various embodiments, bladders 324a, 324b extend from and between the first end 170 of the female forming tool 122 and the second end 172 of the female forming tool 122. However, in various embodiments, bladder 324a or bladder 324b may comprise two or more discrete bladders disposed along the longitudinal direction (e.g., along the X-direction). Likewise, center die 326 may extend from and between the first end 170 of the female forming tool 122 and the second end 172 of the female forming tool 122. However, in various embodiments, center die 326 may comprise two or more discrete center dies disposed along the longitudinal direction (e.g., along the X-direction).

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shape forming tool, comprising:
a female forming tool comprising a die recess;
a support structure moveable with respect to the female forming tool;
a first bladder coupled to the support structure and configured to be received into the die recess;
gripper plates configured to clamp opposing lateral ends of a fibrous preform to the female forming tool; and
at least one actuator associated with the gripper plates and configured to translate the gripper plates laterally;
wherein the support structure is configured to move the first bladder with respect to the female forming tool; and
the first bladder is configured to be inflated to apply a compressive force to compress and form a fibrous preform between the first bladder and the female forming tool.

2. The shape forming tool of claim 1, wherein, in response to being inflated, the first bladder is configured to extend laterally from a first side of a recess surface of the female forming tool to a second side of the recess surface, opposite from the first side.

3. The shape forming tool of claim 2, wherein, in response to being inflated, the first bladder is configured to extend vertically from the support structure to a bottom surface of the recess surface of the female forming tool.

4. The shape forming tool of claim 1, further comprising a center die extending from the support structure toward the female forming tool.

5. The shape forming tool of claim 4, wherein the first bladder is mounted to a first side of the center die.

6. The shape forming tool of claim 5, further comprising a second bladder mounted to a second side of the center die.

7. The shape forming tool of claim 6, wherein the center die is configured to compress the fibrous preform against the female forming tool.

8. The shape forming tool of claim 7, wherein the control unit is further configured to:
control a position of the center die with respect to the female forming tool; and
control a first state of the first bladder and a second state of the second bladder.

9. The shape forming tool of claim 1, wherein the control unit is further configured to control the translation of the gripper plates.

10. The shape forming tool of claim 9, wherein the control unit is further configured to:
receive a compression force of the gripper plates;
receive a tension force of the gripper plates;
receive an inflation pressure of the bladder; and
control at least one of the compressive force of the gripper plates, the tension force of the gripper plates, or the inflation pressure of the bladder based on another of the compressive force, the tension force, or the inflation pressure.

11. The shape forming tool of claim 1, wherein the female forming tool comprises:
a sidewall portion,
a radii surface,
a top surface, and
an angled surface oriented at an angle of between 5 and 75 degrees with respect to the female top surface and disposed between the radii surface and the tool top surface, wherein the gripper plates are configured to clamp the opposing lateral ends of the fibrous preform against the angled surface.

* * * * *